(12) United States Patent
Ozeki

(10) Patent No.: US 9,234,996 B2
(45) Date of Patent: Jan. 12, 2016

(54) DISPLAY DEVICE AND TELEVISION DEVICE HAVING HOLDING MEMBER

(71) Applicant: Sharp Kabushiki Kaisha, Osaka-shi, Osaka (JP)

(72) Inventor: Tsuyoshi Ozeki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/375,841

(22) PCT Filed: Feb. 6, 2013

(86) PCT No.: PCT/JP2013/052686
§ 371 (c)(1),
(2) Date: Jul. 31, 2014

(87) PCT Pub. No.: WO2013/121944
PCT Pub. Date: Aug. 22, 2013

(65) Prior Publication Data
US 2014/0375900 A1    Dec. 25, 2014

(30) Foreign Application Priority Data

Feb. 13, 2012   (JP) ................................ 2012-028072

(51) Int. Cl.
*G09F 13/04*    (2006.01)
*G09F 13/08*    (2006.01)
(Continued)

(52) U.S. Cl.
CPC ............ *G02B 6/0033* (2013.01); *F21V 29/004* (2013.01); *G02B 6/009* (2013.01);
(Continued)

(58) Field of Classification Search
CPC .... F21V 29/004; G02B 6/0033; G02B 6/009; G02F 1/133308; G02F 1/133615; G02F 2001/133317; G02F 1/133608; H04N 5/655
USPC ............. 362/97.1, 97.2, 97.3, 97.4, 611, 612, 362/630, 631; 348/794
See application file for complete search history.

(56) References Cited

U.S. PATENT DOCUMENTS

2007/0165425 A1    7/2007   Sakamoto et al.
2011/0090422 A1*   4/2011   Hamada ............... G02B 6/0085
                                                            349/62

(Continued)

FOREIGN PATENT DOCUMENTS

JP    2007-194067 A    8/2007
JP    2010-101941 A    5/2010

(Continued)

OTHER PUBLICATIONS

English Language Translation of JP2010-101941 Jun. 5, 2010.*

(Continued)

*Primary Examiner* — Bao Q Truong
*Assistant Examiner* — Glenn Zimmerman
(74) *Attorney, Agent, or Firm* — Keating & Bennett, LLP

(57) ABSTRACT

A liquid crystal display device includes an LED, a liquid crystal panel, a light guide plate, a chassis, a frame, a board attachment member, an LED board, and a holding member. The chassis is arranged on an opposite side of the light guide plate from the liquid crystal panel. The frame is arranged on a display surface side of the liquid crystal panel and in contact with the chassis. The frame and the chassis hold the liquid crystal panel, the LED, and the light guide plate therebetween. The board attachment member is mounted on the chassis and spaced apart from the frame. The LED board is in contact with the board attachment member and includes the LED mounted on a plate surface thereof. The holding member sandwiches the board attachment member and the LED board so as to hold the LED board to the board attachment member.

13 Claims, 11 Drawing Sheets

(51) Int. Cl.
*F21V 8/00* (2006.01)
*G02F 1/1333* (2006.01)
*G02F 1/1335* (2006.01)
*F21V 29/00* (2015.01)
*H04N 5/655* (2006.01)

(52) U.S. Cl.
CPC .... *G02F1/133308* (2013.01); *G02F 1/133615* (2013.01); *H04N 5/655* (2013.01); *G02F 2001/133317* (2013.01)

(56) References Cited

U.S. PATENT DOCUMENTS

| | | | |
|---|---|---|---|
| 2011/0141670 A1 | 6/2011 | Jeong | |
| 2012/0081925 A1* | 4/2012 | Cho et al. | 362/613 |
| 2012/0113328 A1 | 5/2012 | Takeshima et al. | |
| 2012/0120326 A1* | 5/2012 | Takata | 348/790 |
| 2012/0293727 A1* | 11/2012 | Yoshikawa | 348/739 |
| 2013/0027977 A1* | 1/2013 | Urano | G02B 6/0036 362/613 |

FOREIGN PATENT DOCUMENTS

| | | | | |
|---|---|---|---|---|
| JP | 2011-029634 A | 2/2011 | | |
| JP | 2011-129508 A | 6/2011 | | |
| JP | 2012-014947 A | 1/2012 | | |
| JP | WO 2013069584 A1 * | 5/2013 | | G09F 3/10 |
| WO | WO 2011013406 A1 * | 2/2011 | | |

OTHER PUBLICATIONS

Official Communication issued in International Patent Application No. PCT/JP2013/052686, mailed on May 14, 2013.

* cited by examiner

DISPLAY DEVICE AND TELEVISION DEVICE HAVING HOLDING MEMBER

TECHNICAL FIELD

The present invention relates to a display device and a television device.

BACKGROUND ART

Displays in image display devices, such as television devices, are now being shifted from conventional cathode-ray tube displays to thin displays, such as liquid crystal displays and plasma displays. With the thin displays, thicknesses of the image display devices can be decreased. Liquid crystal panels do not emit light. Therefore, liquid crystal display devices including liquid crystal panels require backlight devices.

In the backlight devices, light sources mounted on light source boards generate heat on the light source boards while emitting light. Therefore, effective heat dissipation is required for the backlight devices to release the heat generated on the light source boards to the outside of the backlight devices. An example of edge-light type backlight devices in which heat generated on the light source boards can be effectively released to the outside is disclosed in Patent Document 1.

RELATED ART DOCUMENT

Patent Document

Patent Document 1: Japanese Unexamined Patent Publication No. 2011-129508

Problem to be Solved by the Invention

In response to recent demands for reductions in production cost and in thickness, a configuration without a plastic cabinet that is an exterior member of a liquid crystal display may be considered. In a liquid crystal display device without the cabinet, a frame may hold a liquid crystal panel and may constitute an exterior member of the liquid crystal display unit. The frame is a hands-on portion. In general, a light source board is directly or indirectly attached to the frame. Therefore, in the liquid crystal display device without the cabinet, heat generated on the light source board is easily transferred to the frame and this increases a temperature of the frame. Since the frame is the hands-on portion, an excessive temperature increase of the frame is a problem.

The backlight device disclosed in Patent Document 1 includes a cover, a holding portion, a light source board, a bracket. The cover constitutes an exterior member. The holding member is attached to an inner surface of the cover. The light source board is arranged on a plate surface of the bracket and held by the holding member. The bracket has thermal conductivity. In this configuration, heat generated on the light source board remains about the plate surface of the bracket and is less likely to disperse to other areas. Therefore, a temperature increase may occur in areas of the cover where the frame is in contact with the plate surface of the bracket.

DISCLOSURE OF THE PRESENT INVENTION

A technology disclosed herein was made in view of the above circumstances. It is an object of this description to provide a technology that can suppress an excessive temperature increase of a hands-on frame by heat dispersion in a display device without a cabinet.

Means for Solving the Problem

A technology disclosed herein relates to a display device including a light source, a display panel, a light guide plate, a chassis, a frame, a board attachment member, a light source board, and a holding member. The display panel is configured to provide a display using light from the light source. The light guide plate is arranged on an opposite side of the display panel from a display surface side and arranged such that an end surface of the light guide plate is opposite the light source. The light guide plate is configured to guide the light from the light source toward the display panel. The chassis is arranged on an opposite side of the light guide plate relative to the display panel. The frame is arranged on the display surface side of the display panel and in contact with the chassis. The frame holds the display panel, the light source, and the light guide plate with the chassis between the frame and the chassis. The board attachment member is attached to the chassis and spaced apart from the frame. The light source board is in contact with the board attachment member. The light source includes a plate surface on which the light source is mounted. The holding member holds the board attachment member and the light source board so as to attach the light source board to the board attachment member.

According to the above display device, the board attachment member is attached to the chassis and spaced apart from the frame. Heat generated on the light source board is transferred to the chassis via the holding member and the board attachment member, or only via the board attachment member. The heat is then transferred to the frame. In this configuration, heat generated on the light source board disperses to the chassis and the frame and does not only propagate to the frame. Since the heat generated on the light source board disperses, an excessive temperature increase of the frame, namely, a hands-on portion, is less likely to occur.

The holding member may be a clip.

In this configuration, the light source board and the board attachment member are sandwiched between a curved portion of the holding member. Accordingly, the light source board can be held to the board attachment portion by elasticity of the holding member.

The board attachment member may include a plate-like portion that extends from a chassis side to a display panel side.

With this configuration, the light source board is more likely to be in contact with the board attachment member and to be held on the plate surface of the board attachment member.

The display device may further include a printed circuit board electrically connected to the display panel. The holding member may include a plurality of holding members including a first holding member and a second holding member. The first holding member may hold the light source board. The second holding member may hold the light source board and the printed circuit board.

With this configuration, the printed circuit board can be held by the second holding member without any components to hold the printed circuit board including a source board.

The second holding member may have heat conductivity that is lower than heat conductivity of the first holding member.

With this configuration, by the second holding member that is arranged between the light source board and the printed circuit board, heat generated on the light source board and heat generated on the printed circuit board are less likely to be transferred to the counterpart.

The first holding member may be made of metal and the second holding member may be made of plastic.

With this configuration, heat is more likely to be transferred to the chassis and less likely to be transferred to the printed circuit board.

The second holding member may have an S-shaped cross section.

In this configuration, two curved portions that form the S-shape cross section sandwich the light source board and the printed circuit board. Therefore, the second holding member can easily hold the light source board and the printed circuit board. Further, the second holding member may have low heat conductivity. The second holding member having the S-shaped cross section separates the printed circuit board from the board attachment member, and thus heat generated on the printed circuit board can be transferred only to the chassis without through the chassis. Therefore, heat conductive paths for heat generated on an LED board and the printed circuit board can be distributed.

The frame may include a cutout portion such that a portion of the frame opposite the printed circuit board is located farther from the chassis than a portion of the frame that is in contact with the display panel.

With this configuration, drivers including flexible boards that connect the display panel and the printed circuit board can be arranged in a space provided by the cutout portion. Accordingly, the drivers are located fur away from the light source board and thus heat on the light source board is less likely to be transferred to the drivers. Further, noise, which may be caused by the light source board and the drivers in a close position, is less likely to occur.

The light source may include a plurality of light sources mounted on the light source board. The holding member may be in contact with a part of the plate surface of the light source board. The part of the plate surface may be located between the light sources that are adjacent to each other.

With this configuration, the light source and the holding member are less likely to come into contact with each other. Further, light emitted by the light source is less likely to be blocked by the holding member.

The holding member may include a portion that is in contact with the light source board. The portion may include a surface opposite the light guide plate. The surface may be located closer to the light source board than a light emitting surface of the light source.

With this configuration, light emitted by the light source is less likely to be blocked by the holding member.

The holding member may include a plurality of holding members and the light source board may be held by the plurality of the holding members.

With this configuration, the light source board can be effectively held by the plurality of the holding members.

The board attachment member may have a high heat dissipation property than the light source board.

With this configuration, heat on the light source board is more likely to be transferred to the chassis via the board attachment member.

In the technology disclosed herein, a display device including a liquid crystal panel using liquid crystals as the display panel has novelty and utility. Further, a television device including the above display device has novelty and utility.

Advantageous Effect of the Invention

According to the technology disclosed herein, in the lighting device without a cabinet, an excessive temperature increase of the hands-on frame can be suppressed.

MODE FOR CARRYING OUT THE INVENTION

<First Embodiment>

The first embodiment of this invention will be described with reference to FIGS. 1 to 9. The liquid crystal display device (an example of the display device) 10 will be described in this description. An X-axis, a Y-axis, and a Z-axis are described in a part of the drawings, and a direction of each axis corresponds to that of the respective axes in other drawings. The Y-axis direction corresponds to a vertical direction and The X-axis direction corresponds to a horizontal direction. An upper side and a lower side are based on the vertical direction unless otherwise specified.

Figure 1:
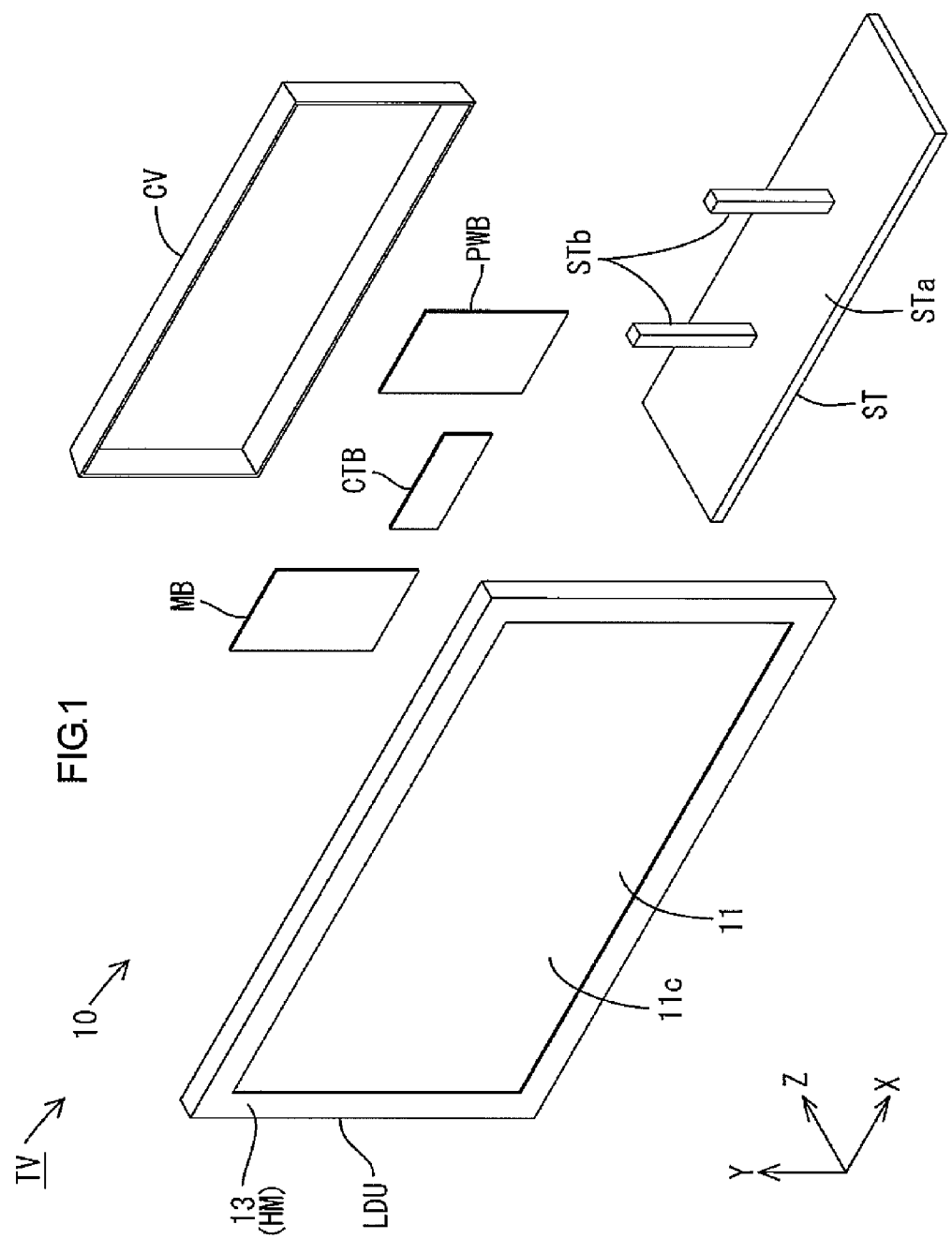
FIG. 1 is an exploded perspective view illustrating a general construction of a television device TV and a liquid crystal display unit LDU according to a first embodiment of this invention.
Figure 2:
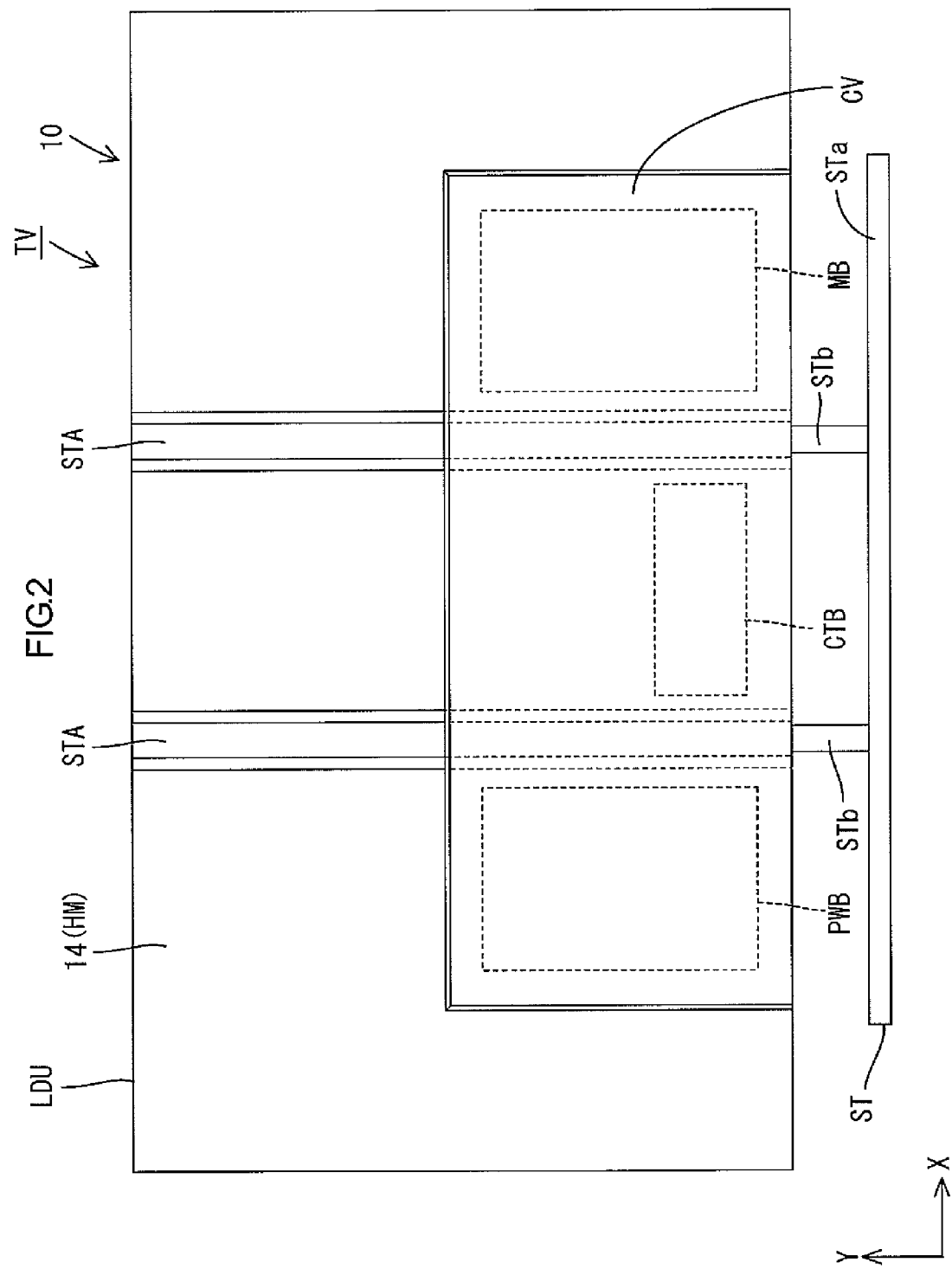
FIG. 2 is a back view of the television device TV and a liquid crystal display device 10.

A television device TV includes a liquid crystal display unit LDU, boards PWB, MB, and CTB, a cover CV, and a stand ST. The boards PWB, MB, and CTB are attached on a rear surface side (a back surface side) of the liquid crystal display unit LDU. The cover CV is attached on the rear surface side of the liquid crystal display unit LDU so as to cover the boards PWB, MB, and CTB. The stand ST holds the liquid crystal display unit LDU such that a display surface of the liquid crystal display unit LDU extends in the vertical direction (a Y-axis direction). The liquid crystal display device 10 according to this embodiment has the same configuration as the television device TV except for at least a component for receiving television signals (e.g. a tuner included in a main board MB). As illustrated in FIG. 2, the liquid crystal display unit LDU has a landscape rectangular shape (rectangular and longitudinal) as a whole. The liquid crystal display unit LDU includes a liquid crystal panel 16 as a display panel and a backlight device 12 as a light source. The liquid crystal panel 11 and the backlight device 12 are held together by a frame 13 and a chassis 22. The frame 13 and the chassis 14 are external members that provide an external configuration of the liquid crystal display device 10. The chassis 14 according to this embodiment constitutes not only the external member but also a part of the backlight device 12.

Configurations of the liquid crystal display device 10 on the rear surface side will be described. As illustrated in FIG. 2, stand attachments STA are attached to a rear surface of the chassis 14 that provides an external configuration of the back of the liquid crystal display device 10. The stand attachments STA are away from each other in an X-axis direction and each extend along the Y-axis direction. Each stand attachment STA has a cross section that corresponds to a cross section of a channel beam and is open to the chassis 14. A space is provided between each stand attachment STA and the chassis 14. Support portions STb included in the stand ST are arranged in the spaces provided between the stand attachments STA and chassis 14. The spaces provided inside the stand attachments STA are paths for wiring members (e.g. electric wires) which are connected to LED boards (an example of light sources) 18 included in the backlight device 12. The stand ST includes a base STa and the support portions STb. The base STa extends parallel to the X-Z plane. The support portions STb stand on the base STa in the Y-axis direction. The cover CV is made of synthetic resin and attached to a part of the rear surface of the chassis 14. Specifically, as illustrated in FIG. 2, the cover CV covers a lower half part of the chassis 14 so as to cross over the stand attachments STA in the X-axis direction. A component storage space is provided between the cover CV and the chassis 14 such that the boards PWB, MB, and CTB, which will be described next, are stored therein.

As illustrated in FIG. 2, the liquid crystal display device 10 includes a power source board PWB, a main board MB, and a control board CTB as the boards PWB, MB, and CTB. The power source board PWB is a power source of the liquid crystal display device 10 and supplies drive power to the other boards MB and CTB and LEDs (an example of light sources) 17 included in the backlight device 12. Namely, the power source board PWB also serves as "an LED drive board (a light source driving board) that drives the LEDs 17." The main board MB includes at least a tuner and an image processor, which are not illustrated. The tuner is configured to receive television signals. The image processor performs image processing on the received television signals. The main board MB is configured to output the processed image signals to the control board CTB, which will be described next. If an external image reproducing device, which is not illustrated, is connected to the liquid crystal display device 10, image signals from the image reproducing device are input to the main board MB. The image processor included in the main board MB processes the image signals, and the main board MB outputs the processed image signals to the control board CTB. The control board CTB is configured to convert the image signals, which is sent from the main board, to driving signals for liquid crystals and to supply the driving signals to the liquid crystal panel 16.

Figure 3:
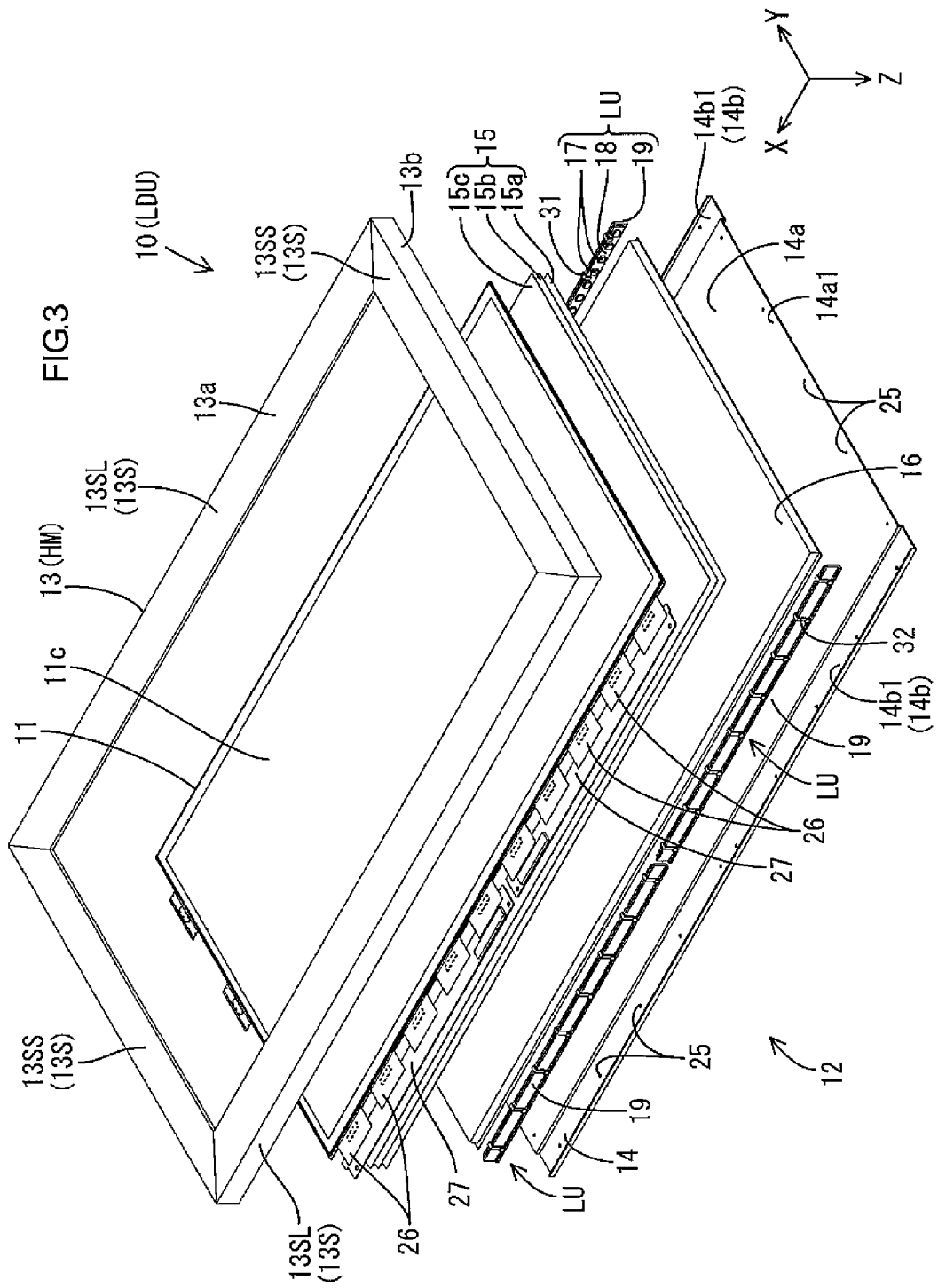
FIG. 3 is an exploded perspective view illustrating a general configuration of the liquid crystal display unit LDU in the liquid crystal display device 10.

As illustrated in FIG. 3, main components of the liquid crystal display unit LDU included in the liquid crystal display device 10 are arranged in a space provided between the frame 13 that provides a front external configuration and the chassis 14 that provides a rear external configuration. In this configuration in which the frame 13 provides the front external configuration of the liquid crystal display device 10, the frame 13 is a hands-on part of the liquid crystal display device 10. The main components arranged between the frame 13 and the chassis 14 are at least the liquid crystal panel 11, optical members 15, a light guide plate 16, and LED units LU. The liquid crystal panel 11, the optical members 15, and the light guide plate 16 are placed on top of one another and held between the frame 13 on the front side and the chassis 14 on the rear side. The backlight device 12 includes the optical members 15, the light guide plate 16, the LED units LU, and the chassis 14. Namely, the liquid crystal display unit LDU without the liquid crystal panel 11 and the frame 13 is the backlight device 12. The LED units LU included in the backlight device 12 are arranged in the space between the frame 13 and the chassis 14. Two LED units LU each are arranged on each end of the light guide plate 16 in a short-side direction (the Y-axis direction) of the light guide plate 16. Each LED unit LU includes LEDs 17 as light sources, the LED board 18, and a heat dissipation member (a heat spreader) 19. The LEDs 17 are mounted on the LED board 18. The LED board 18 is attached to the heat dissipation member 19. Each component will be described next.

As illustrated in FIG. 3, the liquid crystal panel 11 has a landscape rectangular shape (rectangular and longitudinal) in a plan view and includes a pair of glass substrates 11a and 11b and liquid crystals. The substrates 11a and 11b each having high light transmissivity are bonded together with a predetermined gap therebetween. The liquid crystals are sealed between the substrates 11a and 11b. On one of the substrates (an array substrate 11b), switching elements (e.g. TFTs), pixel electrodes, and an alignment film are arranged. The switching elements are connected to gate lines and source lines that are arranged perpendicular to each other. The pixel electrodes are connected to the switching elements. On the other one of the substrates (a CF substrate 11a), color filters, a counter electrode, and an alignment film are arranged. The color filters include red (R), green (G), and blue (B) color portions that are arranged in a predetermined arrangement. The liquid crystal panel 11 is placed on a front side of the optical members 15, which will be described later. A rear-side surface of the liquid crystal panel 11 (an outer-side surface of a polarizing plate on the rear side) is fitted to the optical member 15 with minimal gaps therebetween. Therefore, dust is less likely to enter between the liquid crystal panel 11 and the optical member 15. The liquid crystal panel 11 includes a display surface 11c. The display surface 11c includes a display area and a non-display area. The display area is an inner area of a screen in which images are displayed. The non-display area is an outer area of the screen around the display area with a frame-like shape. The liquid crystal panel 11 is connected to the control board CTB via a driver for driving the liquid crystals and flexible boards 26. The liquid crystal panel 11 displays an image in the display area of the display surface 11c based on signals sent from the control board CTB. The polarizing plates, which are not illustrated, are arranged on outer sides of the substrates 11a and 11b.

As illustrated in FIG. 3, similar to the liquid crystal panel 11, each optical member 15 has a landscape rectangular shape in a plan view and has the same size (a short-side dimension and a long-side dimension) as the liquid crystal panel 11. The optical members 15 are placed on the front side (a light exit side) of the light guide plate 16, which will be described later, and sandwiched between the light guide plate 16 and the liquid crystal panel 11. Three optical members 15 each having a sheet-like shape are placed on top of one another. Specifically, a diffuser sheet 15a, a lens sheet (a prism sheet) 15b, and a reflecting type polarizing sheet 15c and arranged in this sequence from the rear side (the light guide plate 16 side). Each of the three sheets 15a, 15b, and 15c has the substantially same size in a plan view.

Figure 4:
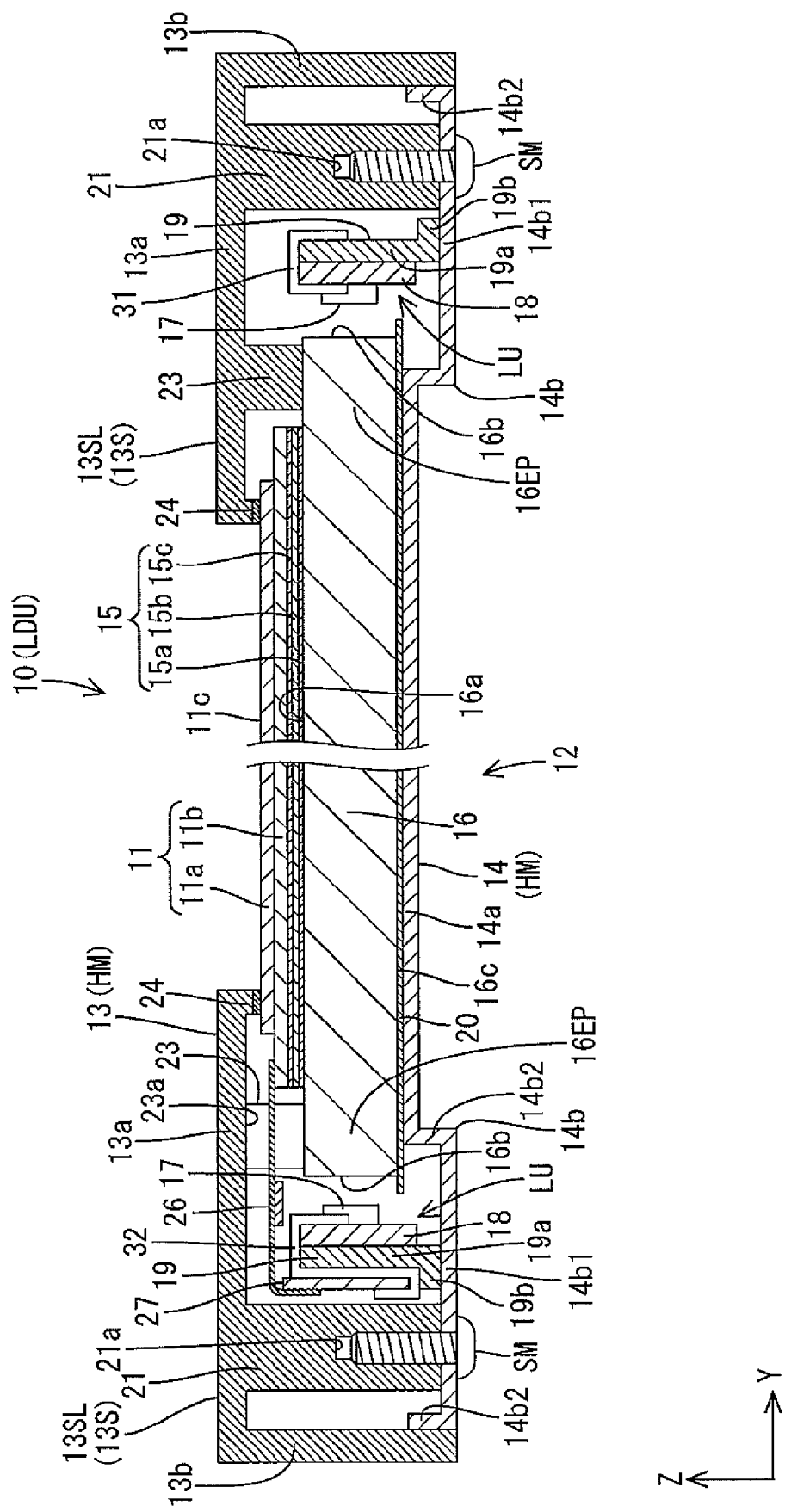
FIG. 4 is a cross-sectional view of the liquid crystal display device 10 taken along a short-side direction thereof.

The light guide plate 16 is made of substantially transparent (high transmissivity) synthetic resin (e.g. acrylic resin or polycarbonate such as PMMA) that has a refractive index sufficiently higher than that of the air. As illustrated in FIG. 3, the light guide plate 16 has a landscape rectangular shape in a plan view similar to the liquid crystal panel 11 and the optical members 15. A thickness of the light guide plate 16 is larger than a total thickness of the optical members 15. A long-side direction and a short-side direction of a main surface of the light guide plate 16 correspond to the X-axis direction and the Y-axis direction, respectively. A thickness direction of the light guide plate 16 that is perpendicular to the main surface of the light guide plate 16 corresponds to the Z-axis direction. The light guide plate 16 is arranged on the rear side of the optical members 15 and sandwiched between the optical members 15 and the chassis 14. As illustrated in FIG. 4, at least a short-side dimension of the light guide plate 16 is larger than those of the liquid crystal panel 11 and the optical members 15. The light guide plate 16 is arranged such that ends thereof in the short-side direction (ends along a short-side direction) protrude outwardly (so as not to overlap) from ends of the liquid crystal panel 11 and the optical members 15. The LED unit LU is arranged on each end in the short-side direction of the light guide plate 16 so as to have the light guide plate 16 between the LED units LU in the Y-axis direction. Light from the LEDs 17 enters the light guide plate 16 through the ends in the short-side direction. The light guide plate 16 is configured to guide the light, which is from the LEDs 17 and enters the light guide plate 16 through the ends in the short-side direction, toward the optical members 15 (on the front side).

One of the main surfaces of the light guide plate 16 that faces the front side (a surface opposite the optical members 15) is a light exit surface 16a. Light exits the light guide plate 16 through the light exit surface 16a toward the optical members 15 and the liquid crystal panel 11. The light guide plate 16 include outer peripheral end surfaces that are adjacent to the main surfaces of the light guide plate 16, and long-side end surfaces (end surfaces in the short-side direction) which have elongated shapes along the X-axis direction are opposite the LEDs 17 (the LED boards 18). A predetermined space is provided between each long-side end and the LEDs 17 (the LED boards 18). The long-side end surfaces are light entrance surfaces 16b through each of which light from LEDs 17 enters. The light entrance surfaces 16b are parallel to the X-Z plane (main surfaces of the LED boards 18) and substantially perpendicular to the light exit surface 16a. An arrangement direction of the LEDs 17 and the light entrance surface 16b corresponds to the Y-axis direction and parallel to the light exit surface 16a.

As illustrated in FIG. 4, a reflection sheet 20 is arranged on the rear side of the light guide plate 16, i.e., a surface 16c opposite to the light exit surface 16a (a surface opposite the chassis 14). Light that travels toward the rear outside through the plate surface 16c is reflected by the reflection sheet 20 toward the front side. The reflection sheet 20 is arranged to cover an entire area of the surface 16c. The reflection sheet 20 is arranged between the chassis 14 and the light guide plate 16. The reflection sheet 20 is made of synthetic resin and has a white surface having high light reflectivity. A short-side dimension of the reflection sheet 20 is larger than that of the light guide plate 16. The reflection sheet 20 is arranged such that ends in the short-side direction thereof protrude closer to the LEDs 17 compared to the light entrance surfaces 16b of the light guide plate 16. Light that travels from the LEDs 17 toward the chassis 14 at an angle is effectively reflected toward the light entrance surfaces 16b of the light guide plate 16 by the protruded portions of the reflection sheet 20. At least one of the light exit surface 16a and the surface 16c opposite to the light exit surface 16a of the light guide plate 16 has a reflection portion (not illustrated) or a scattering portion (not illustrated). The reflection portion is configured to reflect the light inside the light guide plate 16. The scattering portion (not illustrated) is configured to scatter the light inside the light guide plate 16. The reflection portion or the scattering portion may be formed by patterning so as to have a specified in-plane distribution. This configuration regulates the light from the light exit surface 16a to have an even in-plane distribution.

Next, a configuration of each of the LEDs 17 and the LED board 18 included in the LED unit LU will be described. Board attachment members 19 included in the LED units LU will be described in detail later. As illustrated in FIGS. 3 and 4, each LED 17, which is included in the LED unit LU, includes an LED chip arranged on a board that is fixed on the LED board 18 and sealed with resin. The LED chip mounted on the board has one main light emission wavelength. Specifically, the LED chip that emits light in a single color of blue is used. The resin that seals the LED chip contains phosphors dispersed therein. The phosphors emit light in a predetermined color when excited by blue light emitted from the LED chip. Thus, overall color of light emitted from the LED 17 is white. The phosphors may be selected, as appropriate, from yellow phosphors that emit yellow light, green phosphors that emit green light, and red phosphors that emit red light. The phosphors may be used in combination of the above phosphors. The LED 17 includes a main light-emitting-surface 17a that is opposite to a surface on which the LED board 18 is mounted (a surface opposite the light entrance surfaces 16b of the light guide plate 16). Namely, the LED 17 is a top-surface-emitting type LED.

Next, configurations of the frame 13 and the chassis 14 that constitute the external members and a holding member HM will be described. The frame 13 and the chassis 14 are made of metal such as aluminum so as to have mechanical strength (rigidity) and thermal conductivity compared to a frame 13 and a chassis 14 made of synthetic resin. As illustrated in FIG. 3, while the LED units LU are arranged in the space between the frame 13 and the chassis 14 along each end of the frame 13 and the chassis 14 in the short-side direction (the long-side ends), the frame 13 and the chassis 14 hold the liquid crystal panel 11, the optical members 15, and the light guide plate 16, which are placed on top of the other, from the front side and the rear side.

As illustrated in FIG. 3, the frame 13 has a landscape rectangular shape so as to surround the display area in the display surface 11c of the liquid crystal panel 11. The frame 13 includes panel holding portions 13a and sidewalls 13b. Each panel holding portion 13a is parallel to the display surface 11c of the liquid crystal panel 11 and presses the liquid crystal panel 11 from the front side. Each sidewall 13b protrudes from an outer peripheral portion of each panel holding portion 13a toward the rear side. Each of the panel holding portion 13a and the sidewall 13b form an L-like shape in a cross-section. The panel holding portions 13a form a landscape-rectangular and frame-like shape as a whole that correspond to an outer peripheral portion (the non-display area, a frame-like portion) of the liquid crystal panel 11. The panel holding portions 13a press a substantially entire area of the outer peripheral portion of the liquid crystal panel 11 from the front side. The panel holding portion 13a has a width that is large enough to cover not only the outer peripheral portion of the liquid crystal panel 11 but also the outer peripheral portions of the light guide plate 16 and the LED units LU from the front side. The outer peripheral portions of the optical members 15 and the light guide plate 16 and the LED units LU are located on the outer side with respect to the outer peripheral portion of the liquid crystal panel 11 in a radiation direction. Similar to the display surface 11c of the liquid crystal panel 11, a front exterior surface (a surface opposite to the surface facing the liquid crystal panel 11) of each panel holding portion 13a is seen from the front side of the liquid crystal display device 10. The panel holding portions 13a constitute a front exterior of the liquid crystal display device 10 together with the display surface 11c of the liquid crystal panel 11. Each sidewall 13b protrudes from the outer peripheral portion of each panel holding portion 13a toward the rear side. The sidewalls 13b form a substantially rectangular hollow shape as a whole. The sidewall 13b entirely surrounds the liquid crystal panel 11, the optical members 15, the light guide plate 16, and the LED units LU, which are arranged in the space between the frame 13 and the chassis 14, in a peripheral direction thereof. The sidewalls 13b surround the chassis 14 as a whole which is on the rear side, in a peripheral direction thereof. Outer surfaces of the sidewalls 13b that extend in the peripheral direction of the liquid crystal display device 10 face outside of the liquid crystal display device 10. Therefore, the outer surfaces of the sidewalls 13b constitute a top surface, a bottom surface, and side surfaces of the liquid crystal display device 10.

The frame 13 formed in a frame-like shape with the above basic configuration includes four frame pieces 13S that are assembled together. Each frame piece 13S corresponds to each side portion of the frame 13 (long-side portions and shot-side portions). Specifically, the frame pieces 13S include long-side frame pieces 13SL and short-side frame pieces 13SS that constitute long-side portions and short-side portions of the frame 13 (the panel holding portion 13a and the sidewall 13b), respectively. Each long-side frame piece 13SL (refer to FIG. 6) covers not only the liquid crystal panel 11, the optical members 15, and the light guide plate 16 but also the LED units LU. On the other hand, each short-side frame piece 13SS (see FIG. 10) does not cover the LED units LU. Therefore, the long-side frame piece 13SL has a relatively larger width than the short-side frame piece 13SS.

Figure 5:
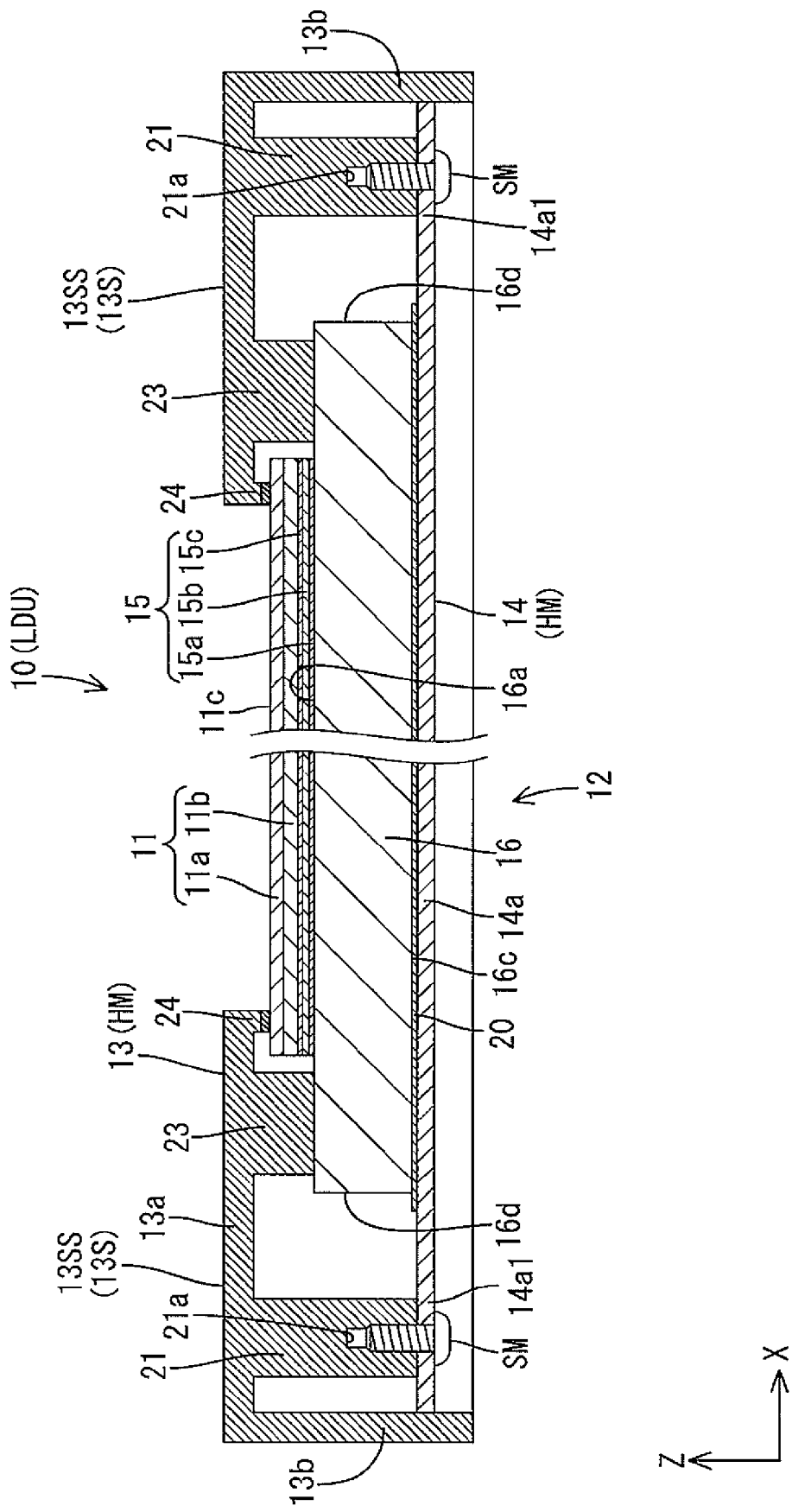
FIG. 5 is a cross-sectional view of the liquid crystal display device 10 taken along a long-side direction thereof.

The panel holding portion 13a includes a screw attachment portion 21 in a more interior position than the sidewall 13b of the panel holding portion 13a (a position away from the sidewall 13b toward the light guide plate 16). Screw members SM are attached to the screw attachment portion 21. The screw attachment portions 21 each protrude from an inner surface of the panel holding portion 13a toward the rear side in the Z-axis direction and each have an elongated block-like shape that extends along a side of the panel holding portion 13a (in the X-axis direction and the Y-axis direction). As illustrated in FIG. 4 and FIG. 5, each screw attachment portion 21 includes a groove 21a that opens to the rear side and to which the screw member SM can be fastened. On printed circuit boards 27 including source boards, the source flexible boards 26 are arranged away from each other in the long-side direction of the printed circuit board 27 and connected to the printed circuit board 27 at the other end thereof. Each printed circuit board 27 includes a connecter (not illustrated) to which an end of an FPC (not illustrated) is connected. The other end of the FPC extends to the rear side of the chassis 14 through an FPC hole (not illustrated) in the chassis 14 and is connected to the control board CTB. Therefore, the printed circuit boards 27 are electrically connected to the liquid crystal panel 11. The printed circuit boards 27 are held by the second holding members 22, which will be described later.

Figure 9:
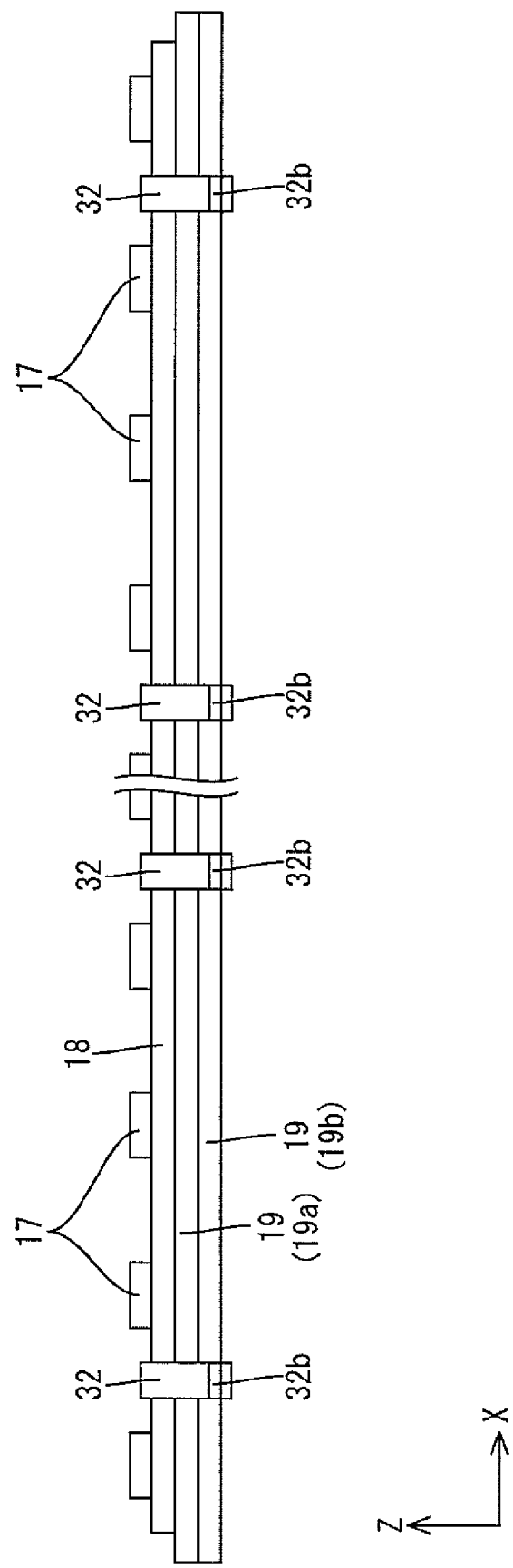
FIG. 9 is a top view of the LED board 18 seen from a front, illustrating the LED board 18 that is held by the second holding members 32 to the board attachment member 19.

As illustrated in FIGS. 4 and 5, the panel holding portion 13a integrally includes a holding protrusion 24 that protrudes from an inner edge of the panel holding portion 13a toward the rear-surface side, i.e., toward the liquid crystal panel 11. The holding protrusion 24 includes a shock absorber 24a at its protruded end. The holding protrusion 24 can press the liquid crystal panel 11 from the front-surface side with the shock absorber in-between. As illustrated in FIG. 9, similar to the screw attachment portion 21, each of the frame pieces 13S that constitute the frame 13 includes the holding protrusion 24 and the shock absorber 24a, and the holding protrusions 24 and the shock absorbers 24a extend along the respective sides of the frame 13. When the frame pieces 13S are assembled together, the holding protrusions 24 and the shock absorbers 24a form a frame-like shape along inner edge portions of the panel holding portions 13a as a whole.

As illustrated in FIG. 3, the chassis 14 has a substantially longitudinal shallow tray shape as a whole and covers overall areas of the light guide plate 16 and the LED units LU from the rear side. A rear outer surface of the chassis 14 (a surface opposite from a surface that faces the light guide plate 16 and the LED units LU) is seen from the rear side and constitutes a back surface of the liquid crystal display device 10. The chassis 14 includes a bottom plate portion 14a and LED housings 14b. The bottom plate portion 14a has a landscape rectangular shape similar to the light guide plate 16. Each LED housing 14b protrudes from long-side ends of the bottom plate portion 14a toward the rear side in a step-like shape and holds the LED units LU.

As illustrated in FIGS. 3 and 4, the bottom plate portion 14a has a plane plate shape so as to receive a middle area of the light guide plate 16 in the short-side direction (except the end portions in the short-side direction) from the rear side. The bottom plate portion 14a will be referred to as a light guide plate receiving portion. As illustrated in FIG. 5, end portions of the bottom plate portion 14a in the long-side direction extend to the outer side with respect to the end portions of the light guide plate 16 in the long-side direction. The end portions of the bottom plate portion 14a in the long-side direction are screw mount portions 14a1 to which the screw members SM are attached from the outside. The screwed members SM hold the frame 13 and the chassis 14 in a fixed condition.

As illustrated in FIGS. 3 and 4, the LED housings 14b are located so as to sandwich the bottom plate portion 14a therebetween in the short-side direction. Each LED housing 14b is recessed from the bottom plate portion 14a toward the rear side to have a space in which the LED units LU can be arranged. Each LED housing 14b includes a screw mount portion 14b1 and side plates 14b2. The screw mount portion 14b1 is parallel to the bottom plate portion 14a and the screw members SM are attached thereto from the outside. The side plates 14b2 rise from ends of the screw mount portion 14b1 toward the front side. One of the side plates 14b2 on the inner side continues to the bottom plate portion 14a. An inner surface of the screw mount portion 14b1 of the LED housing 14b is in surface-contact with bottom plate portions 19b of the board attachment members 19 of the LED unit LU, which will be described later. Another one of the side plates 14b2 of the LED housing 14b on the outer side include an outer surface. The outer surface is in contact with an outer frame portion of the frame 13. The side plate 14b2 on the outer side has a positioning function with which the chassis 14 is properly positioned with respect to the frame 13 in the Y-axis direction.

Configurations of the board attachment members 19 and the holding members 31 and 32, which are main components of this embodiment, will be described. First, configurations of the board attachment members 19 will be described. The board attachment members 19 constitute the LED units LU. Each board attachment member 19 is a member that has a higher heat dissipation property than the LED board 18 (for example, a metal having high heat conductivity such as aluminum). As illustrated in FIGS. 3 and 4, each board attachment member 19 has a bent shape with an L-shaped cross section and includes a side-plate portion 19a and the bottom plate portion 19b. The side-plate portion 19a holds the LED board 18. The bottom plate portion 19b is in contact with a plate surface of the chassis 14. Each board attachment member 19 has a long-side dimension that is substantially equal to a long side dimension of the LED board 18. The board attachment member 19 is arranged apart from the frame 13. The side-plate portion 19a of the board attachment member 19 has a plate-like shape and extends from the bottom plate portion 19b (the chassis 14 side) toward the liquid crystal panel 11 side such that plate surfaces of the side-plate portion 19a are perpendicular to the bottom plate portion 19b. The plate surfaces of the side-plate portion 19a are parallel to plate surfaces of the LED boards 18 and the light entrance surfaces 16b of the light guide plate 16. A long-side direction, a short-side direction, and a thickness direction of each plate surface of the board attachment member 19 correspond to the X-axis direction, the Z-axis direction, and the Y-axis direction, respectively. Each LED board 18 is arranged on an inner surface of the plate surfaces of the side-plate portion 19a, that is, a plate surface opposite the light guide plate 16. The LED board 18 is held by the holding members 31 and 32, which will be described later.

While the side-plate portion 19a of the board attachment member 19 has the long-side dimension that is substantially equal to the long-side dimension of the LED board 18, a short-side dimension of the side-plate portion 19a of the board attachment member 19 is larger than a short-side dimension of the LED board 18. An upper end portion (a front-side end portion) of the side-plate portion 19a in the short-side direction corresponds to an upper end portion of the LED board 18 in the Z-axis direction. A lower end portion (a rear-side end portion) of the side-plate portion 19a in the short-side direction protrudes outward in the Z-axis direction from a lower end portion of the LED board 18. One of the plate surfaces of the side-plate portion 19a on an outer side is a plate surface that is opposite from the plate surface on which the LED boards 18 are mounted. Each screw attachment portion 21 of the frame 13 is opposite the outer plate surface of the corresponding side-plate portion 19a. The LED attachment portions 19a are arranged between the screw attachment portions 21 of the frame 13 and the light guide plate 16. Each side-plate portion 19a rises from an inner end portion of each bottom plate portion 19b toward the front side in the Z-axis direction. In other words, each side-plate portion 19a rises from an end portion on the LED 17 side (the light guide plate 16 side) of each bottom plate portion 19b toward the frame 13. The bottom plate portion 19b will be described later.

As illustrated in FIGS. 3 and 4, the bottom plate portions 19b of the board attachment members 19 each have a plate-like shape that is parallel to the plate surface of the chassis 14. A long-side direction, a short-side direction, and a thickness direction of each bottom plate portion 19b correspond to the X-axis direction, the Y-axis direction, and the Z-axis direction, respectively. The bottom plate portions 19b each protrude outward in the Y-axis direction from a rear end portion of each side-plate portion 19a. In other words, the bottom plate portions 19b each protrude from an end portion on the chassis 14 side toward a side away from the light guide plate 16. A long-side dimension of the side-plate portion 19a is substantially equal to the long-side dimension of the side-plate portion 19a. Each bottom plate portion 19b includes a rear plate surface that is a plate surface opposite the chassis 14. An entire area of the rear plate surface is in surface-contact with the plate surface of the chassis 14. The rear plate surface of the bottom plate portion 19b is attached to the plate surface of the chassis 14 with screws. In this configuration, the bottom plate portions 19b are in surface-contact with the plate surface of the chassis 14 and have a high heat dissipation property. Therefore, heat on the board attachment members 19 is effectively transferred to the chassis 14.

Next, configurations of the holding members 31 and 32 will be described. As illustrated in FIG. 4, each LED board 18 includes a plate surface on which the LEDs 17 are not mounted. The plate surface without the LEDs 17 is in contact with one of the plate surfaces of the side-plate portion 19a of the board attachment member 19. The LED board 18 is attached to the side-plate portions 19a by the holding members 31, 32. The holding members 31, 32 are different kinds of holding members, that is, shapes thereof are different from each other. The first holding members 31 and the second holding members 32 have different shapes from each other. The first holding members 31 hold the LED boards 18 that are located on a side (a right side in FIG. 4) where the printed circuit boards 27 are not arranged. The second holding members 32 hold the LED boards 18 (a left side in FIG. 4) which are located on a side where the printed circuit boards 27 are arranged.

Figure 6:
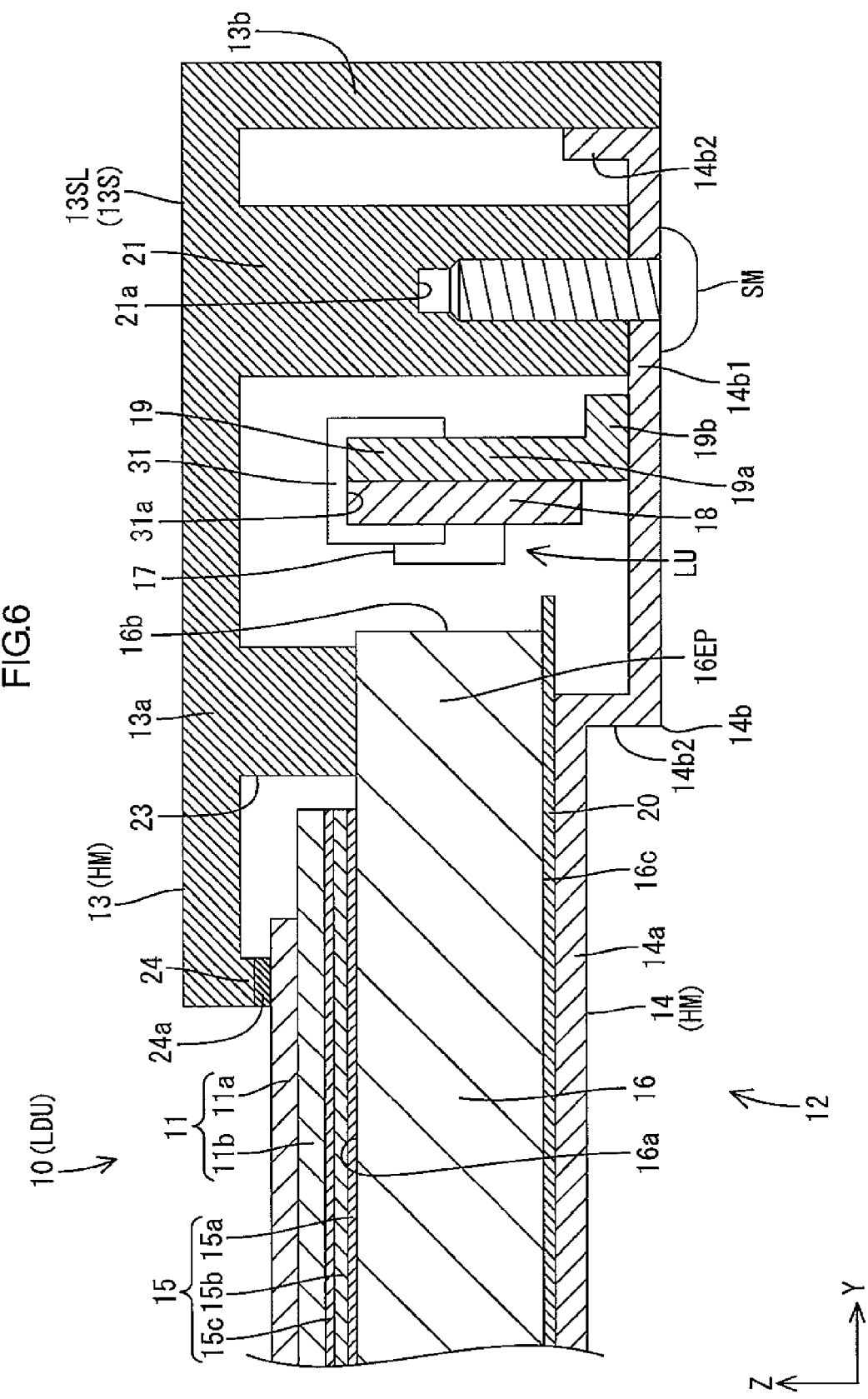
FIG. 6 is a magnified cross-sectional view of FIG. 4 illustrating a first holding member 31 and therearound.

As illustrated in FIG. 6, each first holding member 31 is a clip having a U-shaped cross section. The first holding member 31 is made of metal. The first holding member 31 having the U-shaped cross section includes a curve portion (hereinafter referred to as a first curved portion 31a). The first curved portion 31a serves as a holding portion of a clip and has elasticity. The first curved portion 31a holds an upper portion of the LED board 18 and an upper portion of the board attachment member 19 while the LED board 18 and the board attachment member 19 are in contact with each other. A dimension of the first curved portion 31a in the Z-axis direction is about a half of a dimension of the LED board 18 in the short-side direction. Each of the LED board 18 and the board attachment member 19 is pressed toward a contact portion therebetween by elasticity of the first curved portion 31a. Accordingly, the LED board 18 is held to the board attachment member 19 by the first holding member 31. Herein, the first holding members 31 are made of metal and have high heat conductivity. Therefore, while the LED board 18 is held to the board attachment member 19 by the first holding member 31, heat on the LED board 18 is not only transferred to the board attachment member 19 directly but also transferred to the board attachment member 19 via the first holding member 31.

Figure 7:
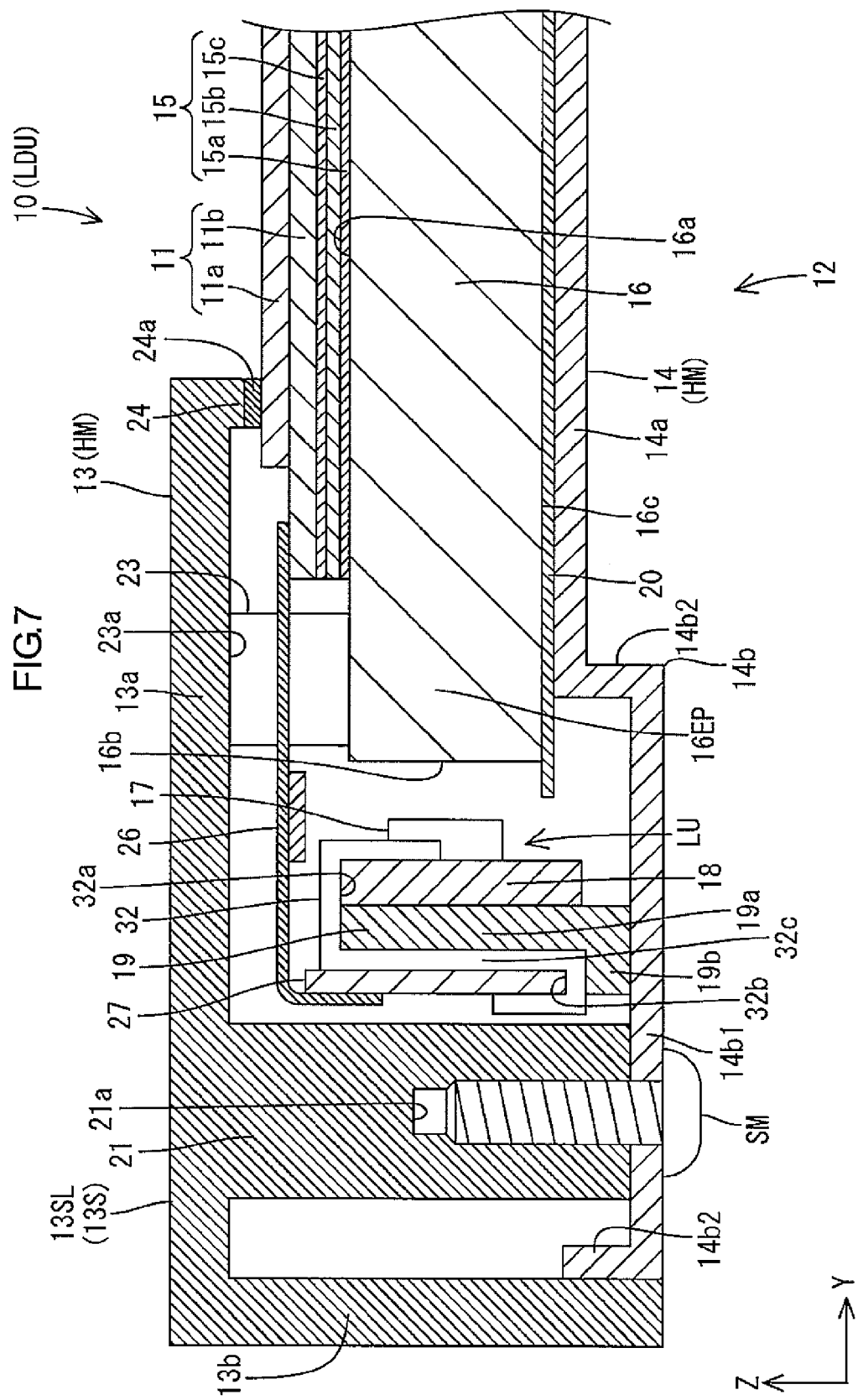
FIG. 7 is a magnified cross-sectional view of FIG. 4 illustrating a second holding member 32 and therearound.

As illustrated in FIG. 7, the second holding member 32 is a clip having an S-shaped cross section. The second holding member 32 is made of plastic. The second holding member 32 having the S-shaped cross section includes two curved portions 32a and 32b and a joint portion 32c that continues to the curved portions 32a and 32b. One of the curved portions located upper in FIG. 7 is hereinafter referred to as a second curved portion 32a and the other one of the curved portions located lower in FIG. 7 is hereinafter referred to as a third curved portion 32b. Each of the second curved portion 32a and the third curved portion 32b serves as a holding portion of the clip and has elasticity. The second curved portion 32a includes a portion that is opposite the light guide plate 16. A dimension of the portion in the Z-axis direction is about a half of a dimension of the LED board 18 in the short-side direction. The second curved portion 32a holds an upper portion of the LED board 18 and an upper portion of the board attachment member 19 while the LED board 18 and the board attachment member 19 are in contact with each other. Similar to the first holding member 31, each of the LED board 18 and the board attachment member 19 is pressed toward a contact portion therebetween by the elasticity of the second curved portion 32a. Accordingly, the LED board 18 is held to the board attachment member 19 by the second holding member 32.

The joint portion 32c of each second holding member 32 has a plate-like shape and has two plate surfaces. One of the plate surfaces is in contact with the side-plate portion 19a of the board attachment member 19. The other one of the plate surfaces is in contact with a plate surface of the printed circuit board 27. The third curved portion 32b includes a portion that is opposite the screw attachment member 21. A dimension of the portion in the Z-axis direction is about a half of a dimension of the printed circuit board 27 in the Z-axis direction. The third curved portion 32b holds a lower portion of the printed circuit board 27. The printed circuit board 27 is pressed from both sides thereof by the elasticity of the third curved portion 32b of the second holding member 32. Accordingly, the printed circuit board 27 is held by the second holding member 32. The second holding member 32 separates the printed circuit board 27 from the board attachment member 19. As described earlier, the second holding member 32 is made of plastic having low heat conductivity. Therefore, heat is less likely to be transferred between the board attachment member 19 and the printed circuit board 27. Heat generated on the LED board 18 is less likely transferred to the printed circuit board 27 via the board attachment member 19 and more likely to be transferred to the chassis 14 via the board attachment member 19.

As described above, each second holding member 32 separates the board attachment member 19 from the printed circuit board 27 and heat generated on the printed circuit board 27 is less likely to be transferred to the board attachment member 19 and more likely to be transferred toward the frame 13 side (an upper side and a left side relative to the printed circuit board 27 in FIG. 7). Herein, the panel holding portion 13a is located on an upper side relative to the printed circuit board 27 in FIG. 7 and the screw attachment portion 21 that is opposite the printed circuit board 27 is arranged on a left side relative to the printed circuit board 27 in FIG. 7. The screw attachment portion 21 extends from the panel holding portion 13a that constitutes a front surface of the frame 13. Therefore, a large proportion of heat generated on the printed circuit board 27 is transferred to the panel holding member 13a of the frame 13 and released from a front surface of the panel holding portion 13a to an outer side.

Figure 8:
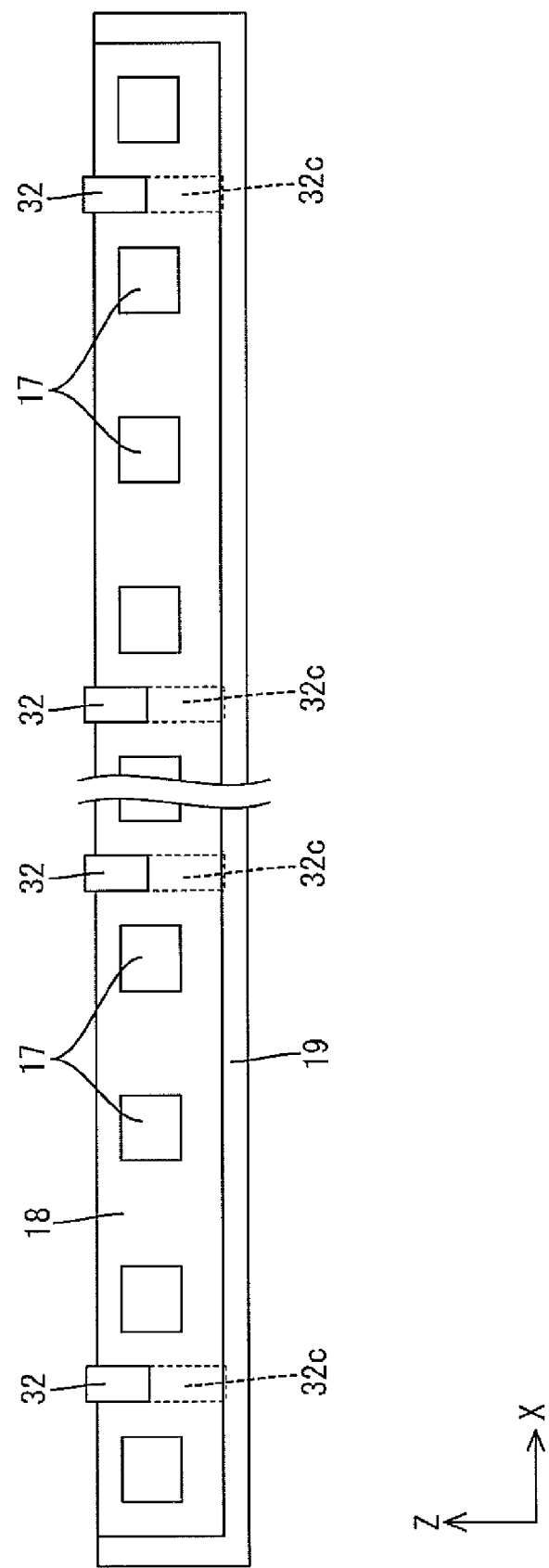
FIG. 8 is a front view of an LED board 18 seen from a front thereof, illustrating the LED board 18 that is held by the second holding members 32 to a board attachment member 19.

Next, arrangement of the holding members 31 and 32 will be described. The arrangement of the first holding members 31 and the arrangement of the second holding members 32 are the same. The arrangement of the second holding members 32 will be described. As illustrated in FIG. 8, each LED board 18 is held by multiple holding members 32. Multiple LEDs 17 are mounted on the LED board 18. The holding members 32 are arranged between the LEDs 17 that are adjacent to each other at substantially equal intervals. As illustrated in FIG. 9, the second curved portions 32a (the first curved portions 31a in the first holding members 31) which hold the LED board 18 have surfaces opposite the light guide plate 16. The surfaces are located closer to the LED board 18 than light emitting surfaces of the LEDs 17.

As described earlier, in the liquid crystal display device 10, heat generated on the LED board 18 that is held by the first holding members 31 is first transferred to the board attachment member 19, and then transferred to the chassis 14 via the board attachment member 19 as well as via the first holding members 31 and the board attachment member 19. A large proportion of the heat is released from a plate surface of the LED housing 14b to the outer side. A proportion of the heat is transferred to the sidewall 14b of the frame 13 via the LED housing 14b and released from a surface of the sidewall 14b to the outer side. Heat generated on the LED board 18 that is held by the second holding members 32 is first transferred to the board attachment member 19, and then transferred to the chassis 14 via the board attachment member 19. A large proportion of the heat is released from the plate surface of the LED housing 14b. A proportion of the heat is transferred to the sidewall 14b of the frame 13 via the LED housing 14b and released from the surface of the sidewall 14b to the outer side. As described earlier, the heat generated on the printed circuit board 27 is transferred to the panel holding member 13a of the frame 13 without transmitting through the chassis 14, and the heat is released from a surface of the panel holding member 13a to the outer side.

A large proportion of the heat generated on the LED boards 18 that are held by the first holding members 31 and the second holding members 32 is released from the respective LED housings 14b of the chassis 14 to the outer side. A proportion of the heat generated on the LED boards 18 are released from the respective sidewalls 14b of the frame 13 to the outer side. The heat generated on the printed circuit boards 27 are released from the panel holding member 13a to the outer side. In the liquid crystal display device 10 of this embodiment, the heat generated on the LED boards 18 and the heat generated on the printed circuit boards 27 disperse to different areas and dissipate to the outside of the liquid crystal display device 10. With this configuration, an increase in local temperature is less likely to occur in the chassis 14 or the frame 13, and thus an excessive temperature increase of the frame 13, which may be the hands-on portion, is less likely to occur.

In the liquid crystal display device 10 according to this embodiment, the board attachment member 19 is attached to the chassis 14 and spaced apart from the frame 13. Therefore, heat generated on the LED board 18 is transferred to the chassis 14 via the holding member 31, 32 and the board attachment member 19 as well as only via the board attachment member 19. The heat is then transferred to the frame 13. The heat generated on the LED board 18 disperses to the chassis 14 and the frame 13 and does not propagate only to the frame 13. With this configuration, heat generated on the LED board 18 disperses and thus an excessive temperature increase of the frame 13 that is the hands-on portion of the liquid crystal display device 10 is less likely to occur.

In the liquid crystal display device 10 according to this embodiment, the holding members 31, 32 are clips. The LED boards 18 and the board attachment members 19 are sandwiched between the curved portions of the holding members 31, 32 that are clips. Accordingly, the LED boards 18 can be held to the board attachment members 19 by elasticity of the holding members 31, 32. Therefore, specific configurations of the holding members 31, 32 are realized.

In the liquid crystal display device 10 according to this embodiment, the board attachment members 19 include the side-plate portions 19a each having a plate-like shape. The side-plate portions 19a extend from the chassis 14 side to the liquid crystal panel 11 side. This realizes specific configurations of the board attachment members 19 in which the LED boards 18 are more likely to be in contact with the board attachment members 19 and held to the plate surfaces of the board attachment members 19.

The liquid crystal display device 10 according to this embodiment further includes the printed circuit boards 27 that are electrically connected to the liquid crystal panel 11. The holding members 31, 32 include the first holding members 31 and the second holding members 32. The first holding members 31 hold the LED boards 18. The second holding members 32 hold the LED boards 18 and the printed circuit boards 27. With this configuration, the printed circuit boards 27 can be held by the second holding members 32 without any components to hold the printed circuit boards 27 including source boards.

In the liquid crystal display device 10 according to this embodiment, the second holding members 32 are made of plastic and the first holding members 31 are made of metal. The second holding members 32 have lower heat conductivity than the first holding members 31. With this configuration, heat generated on the LED boards 18 and heat generated on the printed circuit boards 27 are less likely to be transferred to the counterparts via the second holding members 32 that are arranged between the LED boards 18 and the printed circuit boards 27.

In the liquid crystal display device 10 according to this embodiment, the second holding members 32 each have the S-shaped cross section. The S-shaped cross-section is formed by two curved portions, and the LED boards 18 and the printed circuit boards 27 can be sandwiched between the respective curved portions. Therefore, the second holding members 32 can easily hold the LED boards 18 and the printed circuit boards 27. Further, in the liquid crystal display device 10 according to this embodiment, the second holding members 32 have lower heat conductivity. The second holding members 32 having the S-shaped cross section separate the printed circuit boards 27 from the board attachment members 19. With this configuration, heat generated from the printed circuit boards 27 is transferred only to the frame 13 without transmitting through the chassis 14. Therefore, multiple heat propagating paths through which heat generated on the LED boards 18 and heat generated on the printed circuit boards 27 propagate can be provided.

In the liquid crystal display device 10 according to this embodiment, multiple LEDs 17 are arranged on each LED board 18 and the holding member 31, 32 is in contact with apart of the plate surface of the LED board 18. The part is located between the LEDs 17 adjacent to each other. With this configuration, the LEDs 17 and the holding member 31, 32 are less likely to come into contact with each other. Further, light emitted by the LEDs 17 is less likely to be blocked by the holding member 31, 32.

In the liquid crystal display device 10 according to this embodiment, the holding members 31, 32 each include the portion that is in contact with the LED board 18. The portion in contact with the LED board 18 includes the surface opposite the light guide plate 16. The surface is located closer to the LED board 18 than the light emitting surface of the LED 17. With this configuration, light emitted from the LED 17 is less likely to be blocked by the holding member 31, 32.

In the liquid crystal display device 10 according to this embodiment, the LED board 18 is held by the plurality of the holding members 31, 32. With this configuration, the LED board 18 can be effectively held by the plurality of the holding members 31, 32.

In the liquid crystal display device 10 according to this embodiment, the board attachment member 19 has a high heat dissipation property than the LED board 18. Therefore, heat on the LED board 18 is more likely to be transferred to the chassis 14 via the board attachment member 19.

In the liquid crystal display device 10 according to this embodiment, the LED board 18 can be held to the board attachment member 19 by the holding members 31, 32 without screws, that is, through screw-less attachment.

<Second Embodiment>

Figure 10:
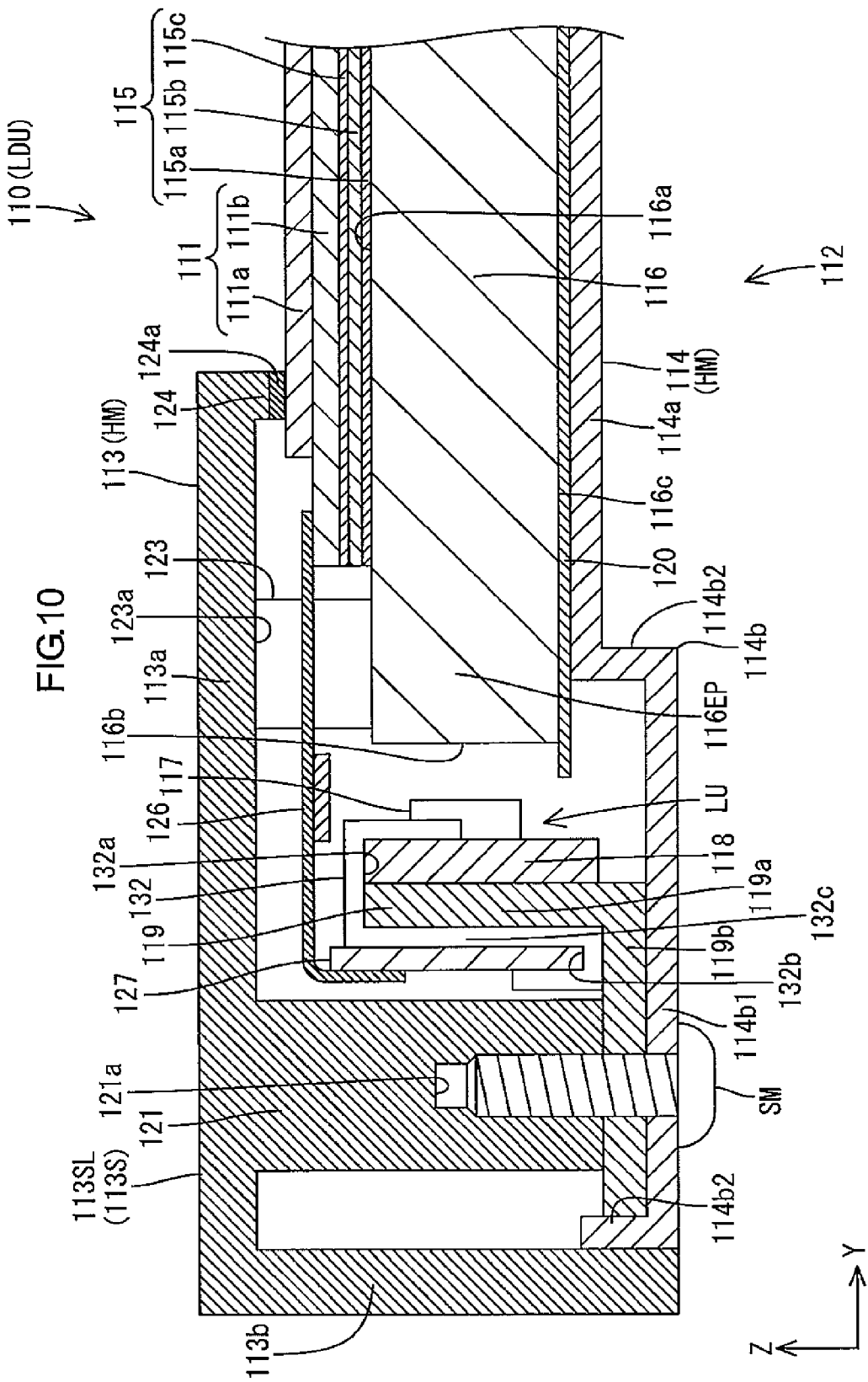
FIG. 10 is a magnified cross-sectional view of a liquid crystal display device 110 according to a second embodiment, illustrating a second holding member 132 and therearound.

The second embodiment will be described with reference to the drawings. A board attachment member 119 of the second embodiment differs from the board attachment member of the first embodiment. The other structures are the same as the first embodiment, and thus configurations, functions, and effects similar to the first embodiment will not be described. In FIG. 10, members and portions indicated by numerals including the reference numerals in FIG. 7 with 100 added thereto have the same configurations as in the first embodiment.

As illustrated in FIG. 7, in a liquid crystal display device 110 according to the second embodiment, a bottom plate portion 119b of the board attachment member 119 extends more to an exterior side than that of the first embodiment. Specifically, the bottom plate portion 119b includes a front plate surface that is opposite a contact surface that is in contact with a chassis 14. The bottom plate portion 119b extends such that the front surface thereof is opposite a screw attachment portion 121 of a frame 113 and in contact with a protruded end surface of the screw attachment portion 121. In this configuration, heat generated on an LED board 118 is transferred to an LED housing 114b via the board attachment member as well as being transferred to a panel holding portion 113a via the board attachment member 119 and the screw attachment portion 121. Namely, heat dispersion different from the first embodiment is provided. Since heat dispersion varies by changing the shape of the board attachment member 119, heat dispersion can be optimally adjusted according to an amount of heat generated by the LED board 118.

<Third Embodiment>

Figure 11:
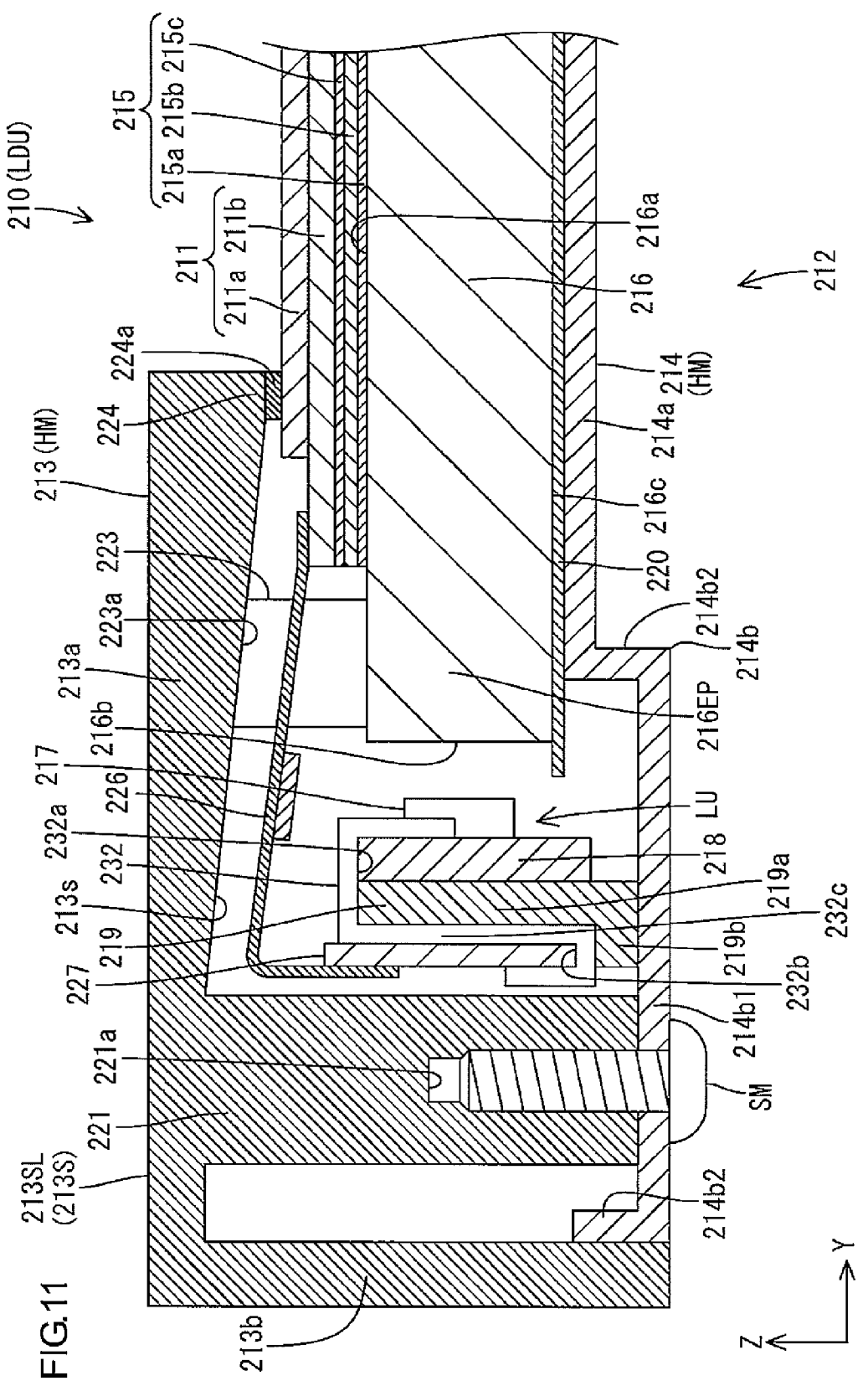
FIG. 11 is a magnified cross-sectional view of a liquid crystal display device 110 according to a third embodiment, illustrating a second holding member 232 and therearound.

The third embodiment will be described with reference to the drawings. A panel holding portion 213a of a frame 213 of the third embodiment partially differs from the panel holding portion 13a of the first embodiment. The other structures are the same as the first embodiment, and thus configurations, functions, and effects similar to the first embodiment will not be described. In FIG. 11, members and portions indicated by numerals including the reference numerals in FIG. 7 with 200 added thereto have the same configurations as in the first embodiment.

As illustrated in FIG. 11, in a liquid crystal display device 210 according to the third embodiment, a part of the panel holding portion 213a of the frame 213 that is opposite a printed circuit board 227 includes a cutout portion 213s. The cutout portion 213s is located close to a front side (an opposite side from a chassis 214) than a holding projection 224 (a portion that is in contact with a liquid crystal panel 211) of the frame 213. A flexible board 226 is arranged in the cutout portion 213s. In the liquid crystal display device 210, the flexible board 226 is located farther from the LED board compared to the configurations of the first and the second embodiments. With this configuration, heat generated on the LED board 218 is less likely to be transferred to the flexible board 226. Further, noise, which may be caused by the LED board 218 and the flexible board 226 in a close position, is less likely to occur.

Modifications of the above embodiments will be described below.

(1) In each of the above embodiments, the holding members are clips. However, the configuration of the holding member is not limited as long as the holding members can hold the board attachment member and the LED board.

(2) In each of the above embodiments, the holding members have the U-shaped cross section or the S-shaped cross section. However, the shapes of the holding members are not limited as long as the holding member can hold the board attachment member and the LED board.

(3) In each of the above embodiment, the light source attachment member includes the side-plate portion and the bottom plate portion. However, the configuration of the light source attachment member is not limited as long as heat generated on the LED board member is transferred to the chassis via the light source attachment member.

(4) The shapes, the configurations, the arrangements, and the numbers of the holding members can be altered from those in the above embodiments as appropriate.

(5) The shapes, the configurations, the arrangements of the light source attachment members can be altered from besides those in the above embodiments as appropriate.

(6) In the above embodiments, the display device is a liquid crystal display device including a liquid crystal panel as a display panel. However, this invention can be applied to display devices including other types of display panels.

The embodiments have been described in detail. However, the above embodiments are only some examples and do not limit the scope of the claimed invention. The technical scope of the claimed invention includes various modifications of the above embodiments.

The technical elements described in this specification and the drawings may be used independently or in combination to achieve the technical benefits. The combinations are not limited to those in claims. With the technologies described in this specification and the drawings, multiple objectives may be accomplished at the same time. However, the technical benefits can be achieved by accomplishing even only one of the objectives.

EXPLANATION OF SYMBOLS

TV: television device, LDU: liquid crystal display unit, PWB: power board, MB: main board, CTB: control board, CV: cover, ST: stand, LU: LED unit, 10, 110, 210: liquid crystal display device, 11, 111, 211: liquid crystal panel, 12, 112, 212: backlight device, 13, 113, 213: 14, 114, 214: chassis, 15, 115, 215: optical member, 16, 116, 216: light guide plate, 19, 119, 219: light source attachment member, 20, 120, 220: reflection sheet, 27, 127, 227: printed circuit board, 31: first holding member, 32, 132, 232: second holding member, 31*a*: first curved portion, 32*a*, 132*a*, 232*a*: second curved portion, 32*b*, 132*b*,232*b*: third curved portion.

The invention claimed is:

1. A display device, comprising:
a light source;
a display panel configured to provide a display using light from the light source;
a light guide plate arranged on an opposite side of the display panel from a display surface side and arranged such that an end surface of the light guide plate is opposite the light source, the light guide plate being configured to guide the light from the light source toward the display panel;
a chassis arranged on an opposite side of the light guide plate relative to the display panel;
a frame arranged on the display surface side of the display panel and in contact with the chassis, the frame holding the display panel, the light source, and the light guide plate with the chassis between the frame and the chassis;
a board attachment member attached to the chassis and spaced apart from the frame;
a light source board in contact with the board attachment member and including a plate surface on which the light source is mounted;
a holding member sandwiching the board attachment member and the light source board so as to hold the light source board to the board attachment member; and
a printed circuit board electrically connected to the display panel; wherein
the holding member includes a first holding member and a second holding member, the first holding member holding the light source board, the second holding member holding the light source board and the printed circuit board.

2. The display device according to claim 1, the holding member is a clip.

3. The display device according to claim 1, wherein the board attachment member includes a plate-like portion that extends from a chassis side to a display panel side.

4. The display device according to claim 1, wherein the second holding member has heat conductivity that is lower than heat conductivity of the first holding member.

5. The display device according to claim 1, wherein the second holding member has an S-shaped cross section.

6. The display device according to claim 1, wherein the frame includes a cutout portion such that a portion of the frame opposite the printed circuit board is located farther from the chassis than a portion of the frame that is in contact with the display panel.

7. The display device according to claim 1,
wherein the light source includes a plurality of light sources mounted on the light source board, and
wherein the holding member is in contact with a part of the plate surface of the light source board, the part thereof being located between the light sources that are adjacent to each other.

8. The display device according to claim 1, wherein the holding member includes a portion that is in contact with the light source board, the portion including a surface opposite the light guide plate, the surface being located closer to the light source board than a light emitting surface of the light source.

9. The display device according to claim 1,
wherein the holding member includes a plurality of holding members, and
wherein the light source board is held by the plurality of the holding members.

10. The display device according to claim 1, wherein the board attachment member has a high heat dissipation property than the light source board.

11. The display device according to claim 1, wherein the display panel is a liquid crystal panel.

12. A television device comprising the display device according to claim 1.

13. The display device according to claim 4, wherein the first holding member is made of metal and the second holding member is made of plastic.

* * * * *